(12) United States Patent
Gonzalez et al.

(10) Patent No.: US 10,370,300 B2
(45) Date of Patent: Aug. 6, 2019

(54) ADDITIVELY MANUFACTURED TURBINE SHROUD SEGMENT

(71) Applicant: General Electric Company, Schenectady, NY (US)

(72) Inventors: Carlos Bonilla Gonzalez, Schenectady, NY (US); Eric John Ruggiero, West Chester, OH (US); Jason Randolph Allen, Loveland, OH (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 84 days.

(21) Appl. No.: 15/799,709

(22) Filed: Oct. 31, 2017

(65) Prior Publication Data

US 2019/0127283 A1    May 2, 2019

(51) Int. Cl.

| | |
|---|---|
| *F01D 5/18* | (2006.01) |
| *C04B 35/63* | (2006.01) |
| *C04B 35/638* | (2006.01) |
| *B22C 3/00* | (2006.01) |
| *F01D 5/22* | (2006.01) |
| *F01D 5/34* | (2006.01) |
| *B33Y 10/00* | (2015.01) |
| *B33Y 80/00* | (2015.01) |

(52) U.S. Cl.
CPC ............. *C04B 35/638* (2013.01); *B22C 3/00* (2013.01); *F01D 5/187* (2013.01); *F01D 5/225* (2013.01); *F01D 5/34* (2013.01); *B33Y 10/00* (2014.12); *B33Y 80/00* (2014.12); *F05D 2220/32* (2013.01); *F05D 2230/21* (2013.01)

(58) Field of Classification Search
CPC ......... C04B 35/63; C04B 35/638; B22C 3/00; F01D 5/18; F01D 5/187; F01D 5/225; F01D 5/34; B33Y 10/00; B33Y 80/00; F05D 2220/32; F05D 2230/21
See application file for complete search history.

(56) References Cited

U.S. PATENT DOCUMENTS

| | | |
|---|---|---|
| 5,165,847 A | 11/1992 | Proctor et al. |
| 5,538,393 A | 7/1996 | Thompson et al. |
| 6,254,333 B1 | 7/2001 | Merry |
| 6,589,011 B2 * | 7/2003 | Beeck .................... F01D 5/081 415/115 |
| 7,670,108 B2 | 3/2010 | Liang |
| 7,988,410 B1 | 8/2011 | Liang |
| 10,221,719 B2 * | 3/2019 | Benjamin ................ F01D 9/04 |
| 2015/0285502 A1 | 10/2015 | DiCintio et al. |
| 2016/0003082 A1 | 1/2016 | Lutjen et al. |
| 2016/0332229 A1 | 11/2016 | Snyder et al. |

\* cited by examiner

*Primary Examiner* — Hieu T Vo
(74) *Attorney, Agent, or Firm* — Fletcher Yoder, P.C.

(57) ABSTRACT

A turbine system includes a turbine shroud segment. The turbine shroud segment includes a backside, a flow path surface opposite to the back side and configured to be disposed adjacent a hot gas path of the turbine system, and side walls extending between the backside of the turbine shroud segment and the flow path surface of the turbine shroud segment. The turbine shroud segment also includes cooling channels disposed in a thickness of the turbine shroud segment between the backside and the flow path surface, where each cooling channel includes an outlet at one of the side walls of the turbine shroud segment.

20 Claims, 12 Drawing Sheets

ADDITIVELY MANUFACTURED TURBINE SHROUD SEGMENT

BACKGROUND

The subject matter disclosed herein relates generally to cooling of a turbine shroud, and more specifically toward additively manufacturing turbine shroud segments.

Certain traditional turbine components may be manufactured, for example, in accordance with traditional manufacturing techniques. For example, a traditional turbine shroud segment may include a thermal management architecture formed primarily via bore holes drilled or otherwise subtracted from a block of material. Bore holes and other traditional turbine shroud segment features may be inefficient with respect to cooling of the traditional turbine shroud segment. Further, traditional turbine shroud segments may include generic features (e.g., consistent features between two of the same components on two different turbine engines, or consistent features between two similar components disposed in different areas of a single turbine engine), which may be poorly equipped to compensate for local thermal loads unique to a particular turbine or a particular area of the turbine.

Accordingly, traditional turbine components may provide too much, or too little, thermal and thermal-stress management to a particular component. Improved turbine components, and manufacturing thereof, is desired.

BRIEF DESCRIPTION

In one embodiment, a turbine system includes a turbine shroud segment. The turbine shroud segment includes a backside, a flow path surface opposite to the back side and configured to be disposed adjacent a hot gas path of the turbine system, and side walls extending between the backside of the turbine shroud segment and the flow path surface of the turbine shroud segment. The turbine shroud segment also includes cooling channels disposed in a thickness of the turbine shroud segment between the backside and the flow path surface, where each cooling channel includes an outlet at one of the side walls of the turbine shroud segment.

In another embodiment, a method of manufacturing a turbine shroud segment includes selecting a thermal management architecture for the turbine shroud segment. The method also includes additively manufacturing the turbine shroud segment, via a casting process, such that the turbine shroud segment includes the selected thermal management architecture.

In another embodiment, a method of manufacturing a turbine shroud segment for a turbine shroud includes thermally modeling, based on an expected thermal loading on the turbine shroud segment corresponding with an expected position of the turbine shroud segment within the turbine shroud, a first digital version of the turbine shroud segment to determine a first thermal model result of the first digital version, where the first digital version comprises a first parameter of a thermal management characteristic. The method also includes thermally modeling, based on the expected thermal loading on the turbine shroud segment corresponding with the expected position of the turbine shroud segment within the turbine shroud, a second digital version of the turbine shroud segment to determine a second thermal model result of the second digital version, where the second digital version comprises a second parameter of the thermal management characteristic, and where the second parameter of the thermal management characteristic is different than the first parameter of the thermal management characteristic. The method also includes selecting to manufacture the first digital version based on a comparison between the first thermal model result and the second thermal model result. The method also includes additively manufacturing the turbine shroud segment based on the first digital version

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
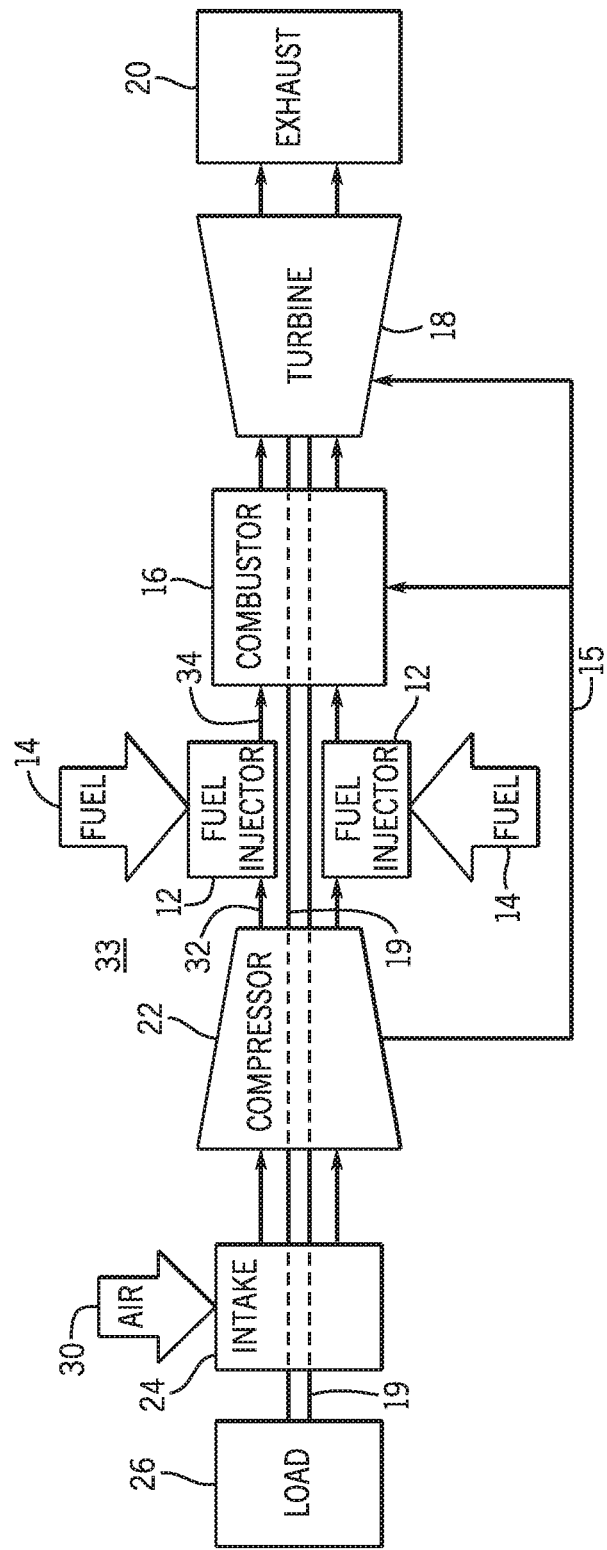
FIG. 1 is a cross-sectional schematic side view of an embodiment of a turbine system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Present embodiments are generally directed toward turbine engine components and manufacturing thereof, and more particularly toward additive manufacturing of segments of a turbine shroud. For example, traditional gas turbine engines may include a shroud of a turbine, where shroud segments (e.g., disposed in an annular configuration) form the shroud. Traditional turbine shroud segments may include a thermal management architecture formed via subtractive processes. For example, bore holes may be drilled in the traditional turbine shroud segment to form cooling channels through which coolant is routed toward and into a hot gas path of the turbine shroud. Unfortunately, subtractive processes may limit a geometry of a thermal management architecture included in the turbine shroud segment. Further, the thermal management architecture of a particular traditional shroud segment may be generic to the turbine in which the traditional shroud segment is disposed, and/or to a location along an annulus of the shroud in which the traditional shroud segment is disposed. Unfortunately, generic designs may be ill-equipped to handle local thermal loads of a particular turbine and/or at a particular location of the turbine.

In accordance with the present disclosure, turbine shroud segments (e.g., replacement turbine shroud segments) may be additively manufactured to facilitate improved thermal management architecture geometries. For example, while subtractive processes may be limited by an ability of the subtracting tool to drill or carve material from a block, additive processes may enable a wide range of durable thermal management architecture geometries that improve cooling efficiency. For example, instead of drilling bore holes from a wall near to a hot gas path within the shroud segment (referred to herein as a "flow path surface") through a backside of the shroud segment, additive processes enable cooling channels that extend downwardly from a plenum above the backside of the shroud segment, and parallel with the flow path surface, such that the cooling channels empty at side walls of the shroud segment (or, in another embodiment, through the flow path surface). Thus, the cooling channels may enable the coolant to move proximate the flow path surface for a longer duration of time, improving cooling of the shroud segment. One additive manufacturing technique, described in detail with reference to the drawings, includes an additive casting core and core die that forms the thermal management architecture, and is used to cast the turbine shroud segment.

Further, in accordance with present embodiments, the turbine shroud segment may be additively manufactured following a tailoring process in which local thermal loading is considered. For example, a turbine shroud segment may be developed for a new turbine shroud, or to replace a segment of an existing turbine shroud. In either case, the manufacturer may be aware of an expected thermal loading on the turbine shroud segment. In accordance with present embodiments, a thermal modeling process may be utilized to determine how various candidate thermal management architectures are expected to respond to the expected thermal loading. For example, traditional thermal modeling software may be used to thermally model the various candidate thermal management architectures. In embodiments where a shroud segment is being developed to replace an existing shroud segment, a baseline digital version of the existing shroud segment may also be thermally modeled to compare against new candidate shroud segments. In other words, the disclosed tailoring process may include thermal modeling of a digital version of a baseline shroud segment (e.g., a digital version of the previous shroud segment being replaced), and thermal modeling of digital versions of various candidate replacement shroud segments (or, more particularly, thermal management architectures thereof)—although, as previously described, no baseline shroud segment is included in certain embodiments. The digital versions of the various candidate shroud segments may include different parameters associated with particular thermal management features, such as a diameter of a cooling channel, a shape of the cooling channel or inlet geometry, cooling channel pitch, and other thermal management features. The thermal modeling results (e.g., thermal management architecture performance results) may then be analyzed to determine whether an improvement over the baseline shroud segment is possible and/or worthwhile, and/or to select one of the digital versions of the candidate shroud segments. The selected candidate digital version is then used for additively manufacturing the shroud segment, in accordance with the present disclosure.

For example, after the digital version of the candidate shroud segment is selected, the candidate shroud segment may be additively manufactured (e.g., via 3-D printing, casting, or a combination thereof, in accordance with the present disclosure). For example, a die (e.g., casting core, casting die, ceramic die, etc.) of the thermal architecture corresponding with the candidate shroud segment may be 3-D printed from the digital version of the candidate shroud segment via, for example, a stereolithography printer ("SLA" printer). The additive ceramic core die may then be utilized in a casting process in which the turbine shroud segment (or a portion thereof) is cast around the additive core die. In other words, the additive core die may be dipped in a liquid form of a material of the turbine shroud segment (or the liquid form of the material may be poured over the additive core die), and left in the material until the material dries (e.g., solidifies into a solid form of the material). The additive core die may then be broken to remove it from the shroud segment having the thermal management features formed about the die. By manufacturing the shroud segment in accordance with the present disclosure (e.g., via additive techniques and iterative thermal modeling), improved thermal management architectures (e.g., having improved durability and efficiency) may be implemented. These and other features will be described in detail below with reference to the drawings.

By additively manufacturing the turbine shroud segment, the turbine shroud segment may include more durable thermal management features, in addition to improved geometry of thermal management features not otherwise possible with conventional embodiments. For example, the thermal management features may include one or more improvements on the following characteristics: shape of the cooling channels, the orientation of the cooling channels, the pitch of the cooling channels, a distance between the channels and the flow path surface (e.g., "offset distance"), the inlet geometry of the cooling channels, the channel diameters, a ratio of the channel diameter (or other height dimension, in non-circular embodiments) to a shroud segment thickness, a ratio of the offset distance to the shroud segment thickness, a ratio of the pitch to the channel diameter, etc. These and other features will be described below with reference to the drawings.

Turning now to the drawings, FIG. 1 is a block diagram of a turbine system 10. As described in detail below, the disclosed turbine system 10 (e.g., aeroderivative turbine engine, jet engine, turboprop engine, gas turbine engine, etc.) may employ a turbine shroud having cooling channels, described below, where the cooling channels may reduce the stress modes in the hot gas path components, thereby improving durability and efficiency of the turbine system 10. In some embodiments, during a lifetime of the turbine system 10, components of the turbine shroud may be replaced. In accordance with one aspect of the present disclosure, certain components of the illustrated turbine system 10 may be additively manufactured, for example, to improve thermal management features of the components. For example, shroud segments of a turbine 18 of the turbine system 10 may be additively manufactured to facilitate more complex thermal management geometries that better facilitate cooling of the turbine 18.

In another aspect of the present disclosure, replacement components for the turbine shroud of the turbine 18 may be additively manufactured following an iterative process in which digital versions of candidate replacement components (e.g., turbine shroud segments) are analyzed. In other words, the turbine 18 of the turbine system 10 may include shroud segments that, over time, benefit from replacement. In some embodiments, the turbine 18 of the turbine system 10 may include traditionally manufactured segments being replaced. In such embodiments, the shroud segment may be tailored, by considering expected local thermal loading, to include a thermal management architecture specifically designed to efficiently utilize cooling from a cooling air bleed 15 with respect to the expected local thermal loading. These and other features will be described in detail with reference to later drawings.

Continuing with FIG. 1, the turbine system 10 includes a fuel injector 12, a fuel supply 14, a combustor 16, and a turbine 18. As illustrated, the fuel supply 14 routes a liquid fuel and/or gas fuel, such as natural gas, to the gas turbine system 10 through the fuel injector 12 and into the combustor 16. As discussed below, the fuel injector 12 is configured to inject and mix the fuel with compressed air. The combustor 16 ignites and combusts the fuel-air mixture, and then passes hot pressurized exhaust gas into the turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As previously described, hot gas components (e.g., turbine shroud, nozzle, etc.) are located in the turbine 18, where hot gases flow across the components. The thermally induced loads from the hot gases may cause creep, oxidation, wear, and thermal fatigue of the turbine components. Accordingly, the turbine 18 may include one or more turbine shroud segments having cooling passages to enable management of the temperature of the hot gas path components (e.g., utilizing less cooling air than typical cooling systems for shrouds) to reduce stress modes in the components, to extend service life of the components (while performing their intended functions), reduce costs associated with operating the turbine system 10, and to maintain a high efficiency of the gas turbine system 10. In accordance with present embodiments, a turbine shroud segment may be additively manufactured (e.g., via casting about an additive core die, as previously described), to facilitate more complex thermal management architectures/geometries that improve cooling deficiency. Further, in some embodiments, the thermal management architecture/geometry may be designed at least in part via a thermal modeling process in which candidate architectures/geometries are compared based on thermal modeling results that take into account expected local thermal loading. These and other features will be described in detail with reference to later drawings.

Figure 2:
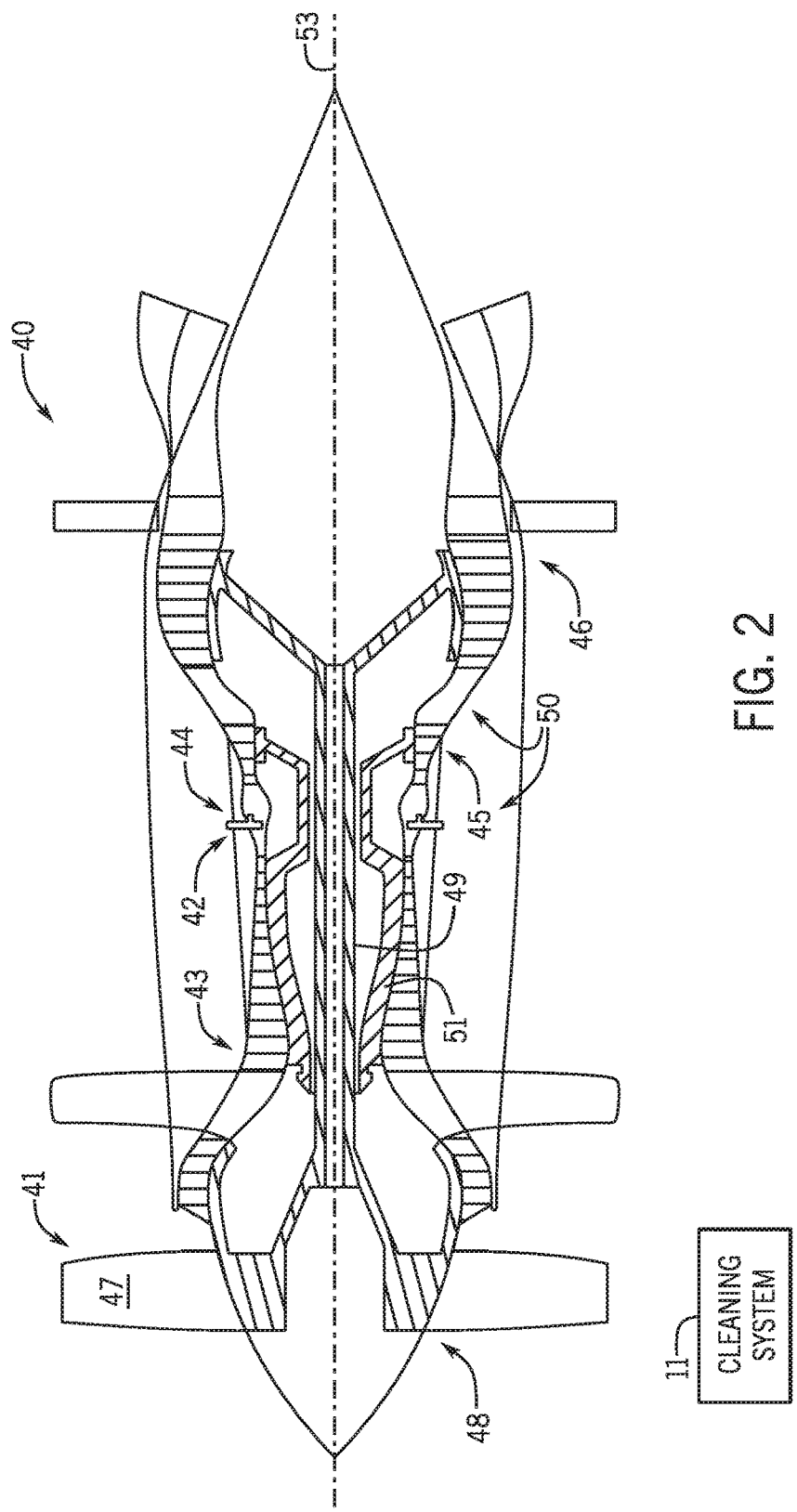
FIG. 2 is a cross-sectional schematic side view of an embodiment of an aircraft gas turbine system, in accordance with an aspect of the present disclosure.

FIG. 2 illustrates a cross-sectional schematic view of an embodiment of an aircraft gas turbine engine 40 (e.g., aeroderivative gas turbine engine) that includes a fan assembly 41 and a core engine 42 including a high pressure compressor 43, a combustor 44, a high-pressure turbine (HPT) 45, and a low-pressure turbine (LPT) 46. The illustrated aircraft gas turbine engine 40 may be an example of the gas turbine engine 10 illustrated in FIG. 1. In the illustrated embodiment, the fan assembly 41 of the gas turbine engine 40 (e.g., aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flow (not shown) from the combustor 44 drives the turbines 45 and 46. The HPT 45 drives the compressor 43 by way of the shaft 51, and the LPT 46 drives the fan assembly 41 by way of the shaft 49.

Figure 3:
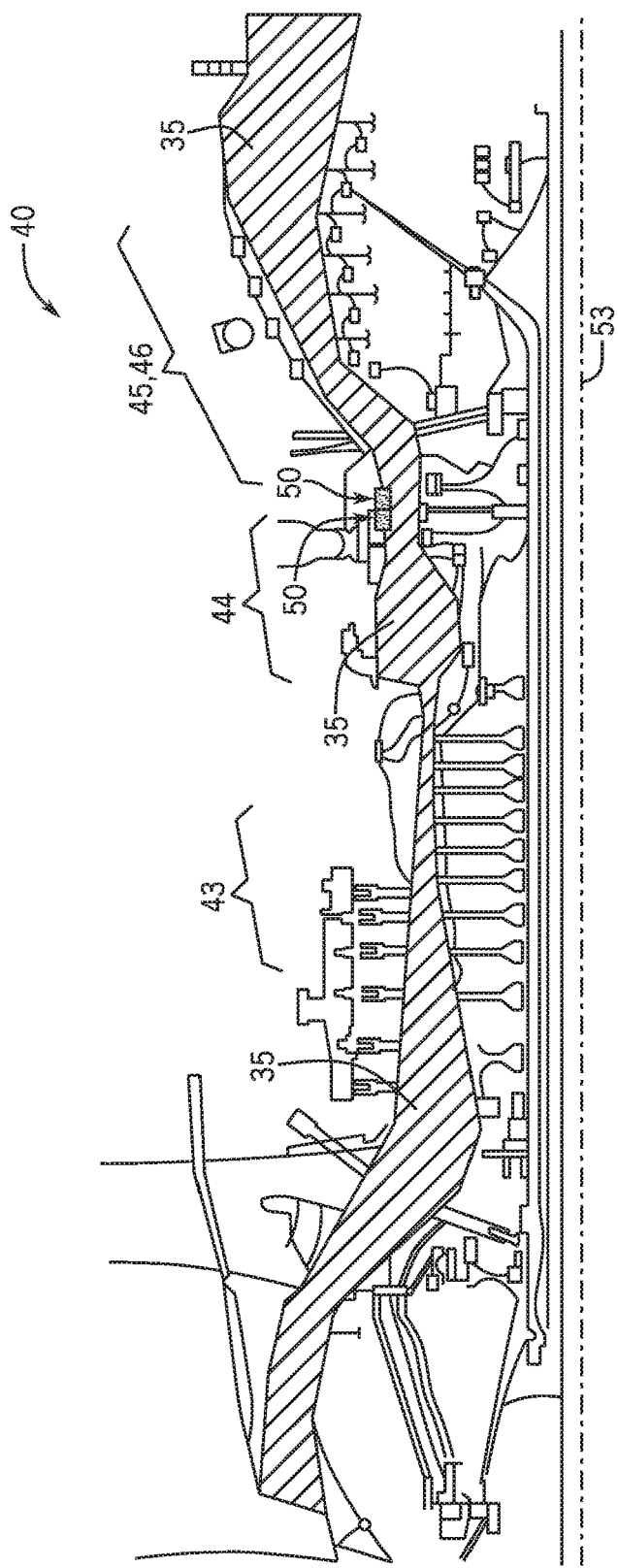
FIG. 3 is a cross-sectional schematic view of an embodiment of a fluid passageway of the turbine system of FIG. 2, in accordance with an aspect of the present disclosure.

An example of an embodiment of a fluid passageway 35 extending continuously through various components of the gas turbine engine 40 of FIG. 2 (e.g., through at least the compressor 43, the combustor 44, and the turbine stages 44, 45) is shown in FIG. 3. The fluid passageway 35 may generally correspond with a hot gas path of the turbine 40 engine proximate the HPT 45 and LPT 46. Accordingly, a shroud 50 (e.g., housing) surrounding the HPT 45 and/or LPT 46 may be heated by the hot gas passing through the fluid passageway 35. For example, the shroud 50 may include segments extending annularly about the center line 53. The shrouds may be exposed to harsh and strenuous conditions, thus requiring efficient and effective thermal management to minimize fatigue and wear over time and meet technical. In accordance with present embodiments, turbine shroud segments may be additively manufactured to include thermal management architectures that improve cooling and, thus, reduce fatigue and wear. In some embodiments, a turbine shroud segment may be additively manufactured as a replacement part for a pre-existing turbine shroud. In other embodiments, a new turbine shroud may be arranged to include additively manufactured turbine shroud segments, in accordance with the present disclosure.

Figure 4:
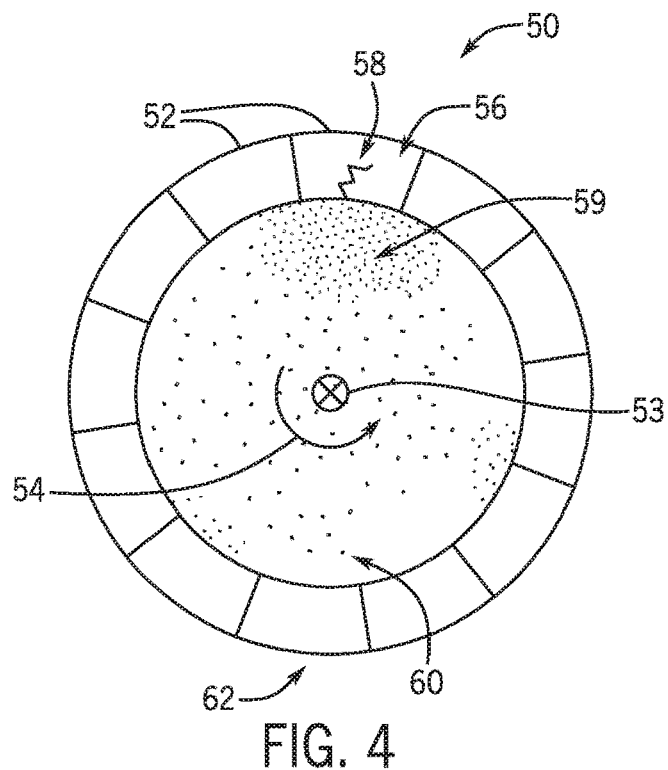
FIG. 4 is a schematic side view of an embodiment of an annular turbine shroud, in accordance with an aspect of the present disclosure.

FIG. 4 is a schematic front view of an embodiment of the turbine shroud 50 of FIGS. 2 and 3. In the illustrated embodiment, the turbine shroud 50 includes twelve segments 52 extending in an annular direction 54 about the centerline 53. However, a different number of segments 52 is possible, such as 2, 3, 4, 5, 6, 7, 8, 9, 10, 11, 13, 14, 15, 16, or more segments 52. An uppermost segment 56 of the turbine shroud 50 includes a defect 58 (or failure mode), namely, the uppermost segment 56 includes a thermally induced crack.

In the illustrated embodiment, dots are included to schematically illustrate a thermal loading of hot gases passing through the turbine on the turbine shroud 50. For example, dense regions of dots represent higher thermal loading than sparse regions of dots. Thus, a thermal loading in a first region 59 proximate the uppermost segment 56 (i.e., by hot gases passing the turbine shroud 50) is more substantial than in other areas proximate the turbine shroud 50, such as a second region 60 proximate a lowermost segment 62 of the turbine shroud 50. In traditional configurations, the uppermost segment 56 and the lowermost segment 62 may include the same or similar thermal management architecture, despite differences in thermal loading. Thus, the uppermost segment 56 may fatigue (or fail).

Further, in traditional configurations, when the uppermost segment 56 fails, the uppermost segment 56 may be replaced with another shroud segment having thermal management features that are generic to differences in thermal loading. By additively manufacturing turbine shroud segments, improved thermal management architecture/geometries can be achieved (e.g., having improved channel size, shape, orientation, pitch, flow direction, complexity, etc.). Further, in some embodiments (e.g., for design of replacement shroud segments of an existing turbine, or if expected local thermal loading of a new turbine shroud being designed is known), candidate turbine shroud segments are considered in an iterative tailoring process that determines which candidate shroud segment responds best to a particular thermal loading. In other words, certain embodiments of the present disclosure are directed toward tailoring a segment (e.g., replacement segment) for the turbine shroud 50 based on thermal loading characteristics unique to (a) a location of the segment to be replaced; and/or (b) the particular turbine in which the replacement segment is to be disposed.

Figure 5:
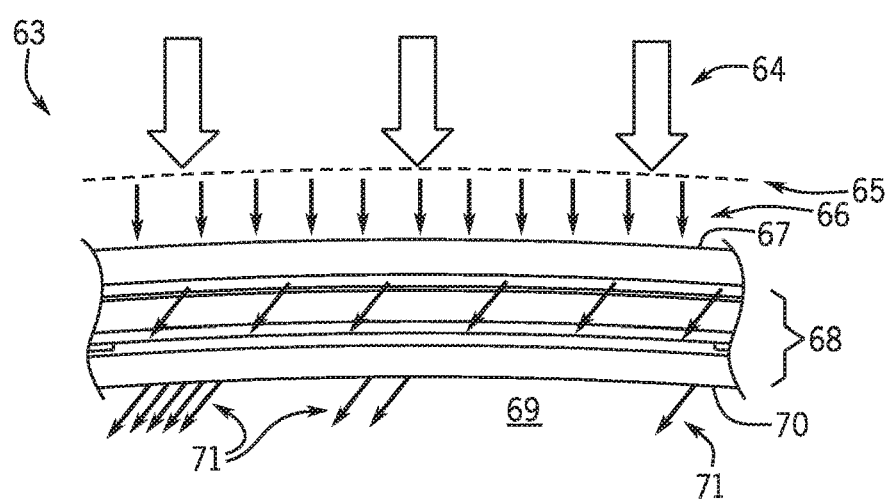
FIG. 5 is a schematic front view of an embodiment of a prior art turbine shroud segment, in accordance with an aspect of the present disclosure.
Figure 6:
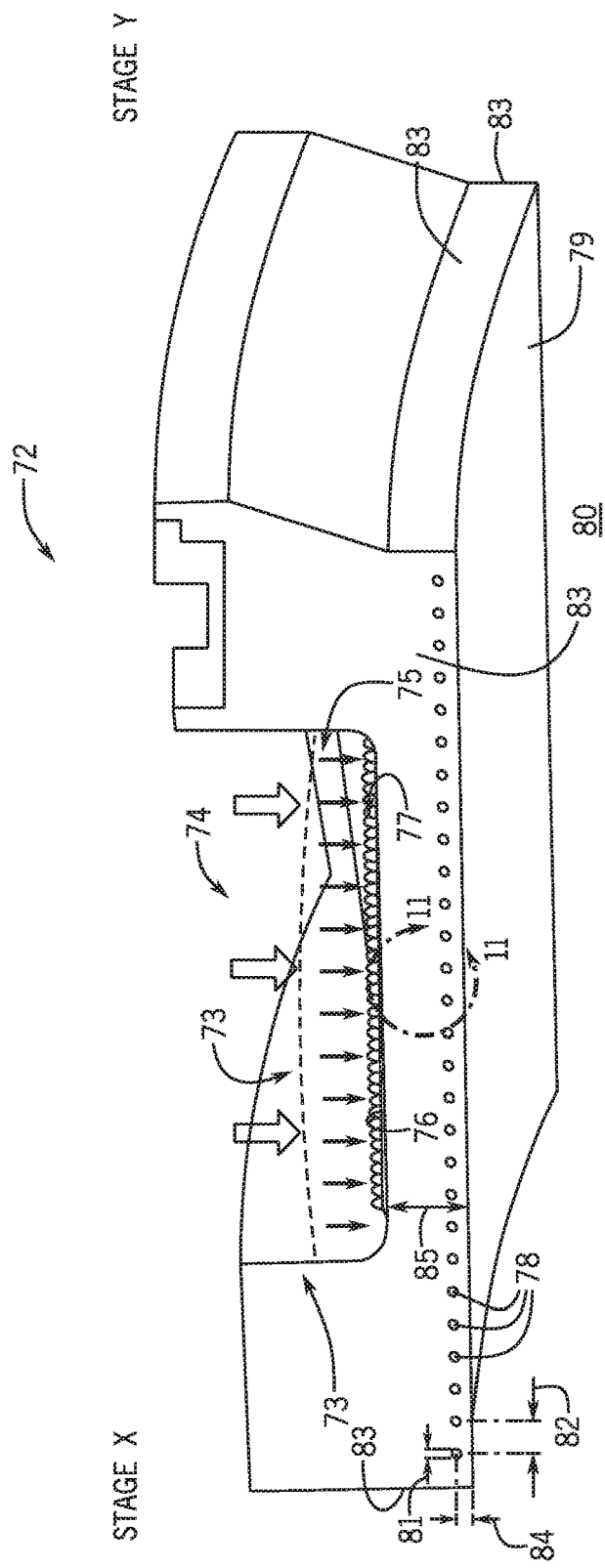
FIG. 6 is a schematic cross-sectional side perspective view of an embodiment of an additively manufactured turbine shroud segment, which may be utilized to replace the prior art turbine shroud segment of FIG. 5, or for use in a separate turbine or turbine shroud, in accordance with an aspect of the present disclosure.
Figure 7:
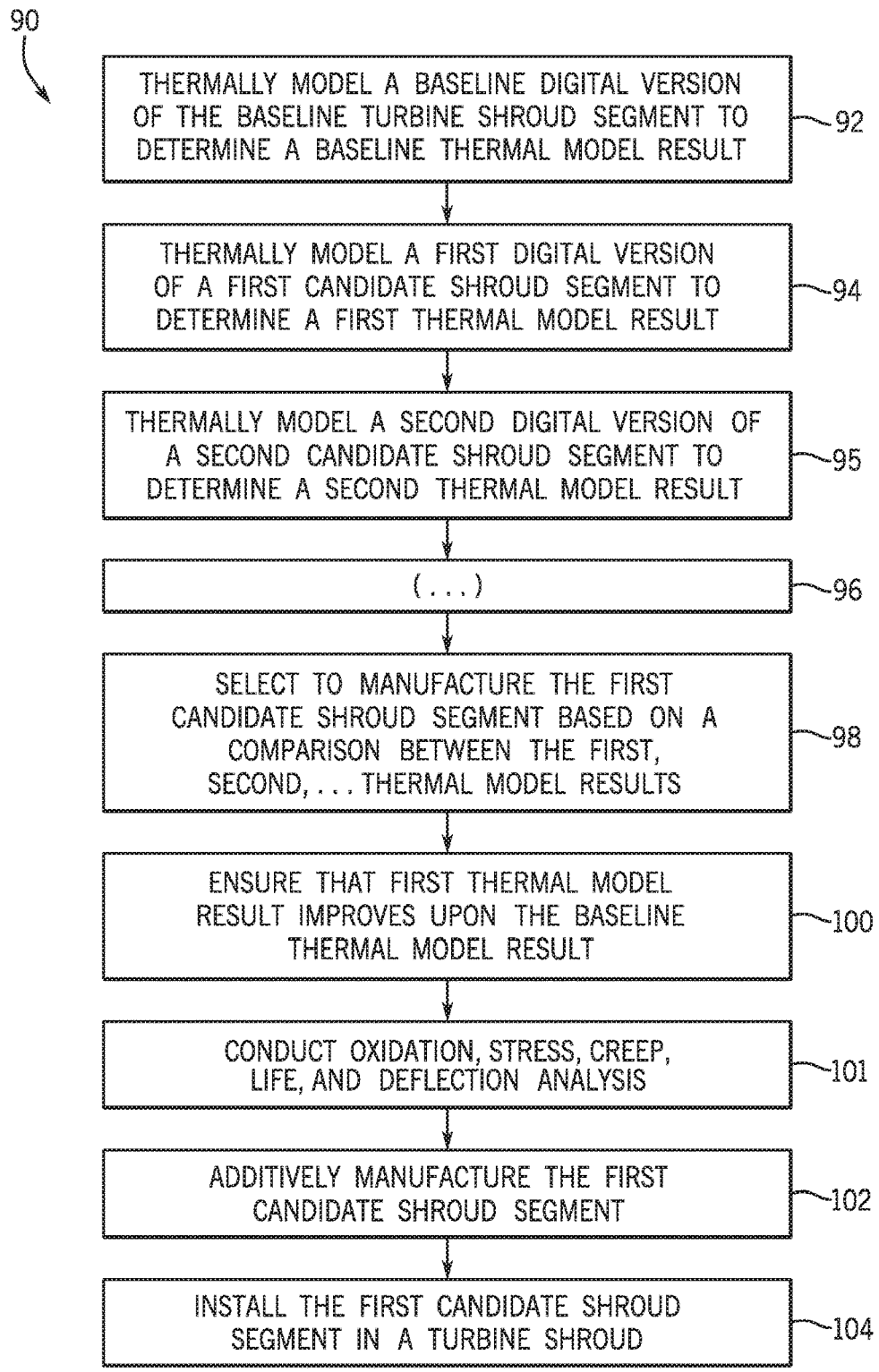
FIG. 7 is an embodiment of a method of manufacturing a turbine shroud segment of a turbine shroud, in accordance with an aspect of the present disclosure.

To help illustrate, FIG. 5 is a schematic front view of an embodiment of a prior art turbine shroud segment 63, and FIG. 6 is a schematic cross-sectional side perspective view of an embodiment of an additively manufactured turbine shroud segment 72 (which, in some embodiments, may replace the prior art turbine shroud segment 63 of FIG. 5). While FIG. 7 illustrates an embodiment of a method 90 by which the turbine shroud segment 72 is designed, manufactured, and installed for replacing, for example, the prior art turbine shroud segment 63, FIGS. 5 and 6 will be discussed first to introduce nomenclature relevant for discussion of the method 90 of FIG. 7.

Focusing first on FIG. 5, the prior art turbine shroud segment 63 receives a cooling air input 64 (e.g., compressed air input) at an impingement baffle 65. The impingement baffle 65 creates discrete impingement jets 66 for cooling a backside 67 of the prior art turbine shroud segment 63. Bore holes 68 drilled through the backside 67 of the prior art turbine shroud segment 63 route the cooling air originating from the cooling air input 64 toward a hot gas path 69 (e.g., of the turbine) adjacent a flow path surface 70 of the baseline turbine shroud segment 63. In particular, the bore holes 68 channel the air through the flow path surface 70 exhausting spent cooling air output 71 into the hot gas path 69. The spent cooling air output 71 exiting the flow path surface 70 may include a higher temperature than the cooling air input 64 temperature. An effectiveness of the thermal management architecture of the prior art turbine shroud segment 63 (and any turbine shroud segment) may be approximated by considering a difference between the temperature of the cooling air input 64 and the temperature of the cooling air output 71. In the illustrated embodiment, the difference between the cooling air input 64 and the cooling air output 71 may be small. Thus, a different thermal management architecture (e.g., having different cooling channel size, cooling channel shape, cooling channel orientation, air flow direction, cooling channel distance to the flow path surface, or pitch between adjacent cooling channels) may be desired to improve cooling.

Focusing on FIG. 6, the additively manufactured shroud segment 72 also includes an impingement baffle 73 that receives a cooling air input 74, where the impingement baffle 73 creates discrete impingement jets 75 that contact and cool a backside 76 of the additively manufactured shroud segment 72. The backside 76 of the additively manufactured shroud segment 72 may include bumps or fins 77, as shown in the illustrated embodiment, which facilitate improved cooling of the backside 76. Inlets (not shown) in the backside 76 of the additively manufactured shroud segment 72 enable the spent air of the discrete jets 75 to enter channels 78 of the additively manufactured shroud segment 72. The channels 78 extend along a flow path surface 79 adjacent a hot gas path 80 (e.g., of the turbine in which the additively manufactured shroud segment 72 is to be disposed).

As shown in the illustrated embodiment, the channels 78 may be characterized in several ways. For example, the channels 78 may include a particular diameter 81 desirable for thermal management. Further, a pitch 82 between the channels 78 may be selected for desirable thermal management. A pitch ratio (i.e., the pitch 82 divided by the diameter 81) may also be considered. Further still, a distance 84 between the channels 78 and the flow path surface 79 may be selected for desirable thermal management. Still further, an orientation (e.g., along or substantially parallel with the flow path surface 79) of the channels 78 may be selected, a flow direction of the cooling air through the channels 78 may be selected (e.g., all in one direction, all in the other direction, alternating directions between adjacent channels 78, etc.), and other features may be selected (e.g., based on desired thermal management and additive manufacturing capabilities). Although not shown in the illustrated embodiment (but included in later illustrations) due to the illustrated cross-section, the channels 78 may also include bends and turns that would not otherwise be possible via drilling.

As will be appreciated in view of the discussion below, the thermal management architecture of the turbine shroud segment 72 (and of any of the candidate shroud segments considered during the iterative tailoring and selection process described with reference to later drawings) may be enabled by an additive manufacturing process. For example, while the bore holes 68 of the prior art turbine shroud segment 63 in FIG. 5 extend through the flow path surface 70 of the prior art turbine shroud segment 63 (and are generally punched or drilled from a pre-formed component), the cooling channels 78 of the additively manufactured turbine shroud segment 72 of FIG. 6 extend along the flow path surface 79 and in one embodiment empty into sides 83 of the shroud segment 72, thereby increasing an amount of time the air is in contact with the shroud. The additive manufacturing process may also facilitate improved durability of delicate and complex thermal management architectures, which traditional manufacturing processes may be incapable of producing.

It should be noted that, while the prior art turbine shroud segment 63 of FIG. 5 is generally illustrated including features (e.g., the bore holes 68) of a segment manufactured using techniques other than additive manufacturing, in some embodiments, a baseline turbine shroud segment (e.g., of a pre-existing turbine) needing replacement may have been manufactured utilizing additive manufacturing techniques. For example, a turbine shroud segment may be designed using additive manufacturing techniques in accordance with the present disclosure, and at a later date (e.g., during maintenance), a replacement additively manufactured shroud segment may replace the previous additively manufactured shroud segment. In other words, the disclosed tailored manufacturing process is still applicable for determining an improved thermal management architecture for a replacement turbine shroud segment over the baseline shroud segment based on local thermal loading (e.g., at a later date during maintenance or repair), even if the baseline shroud segment is additively manufactured. In other words, the present disclosure is directed not only toward additively manufacturing turbine shroud segments, but also to tailoring geometries of the thermal management architectures of turbine shroud segments based on local thermal loading.

FIG. 7 illustrates an embodiment of a method 90 of designing and manufacturing a replacement shroud segment of a turbine shroud. It should be noted that the term "baseline" is used below. In general, the "baseline" shroud segment is a segment for comparison, such as a segment being benchmarked against by other segments (e.g., candidate segments). Although FIG. 5 discusses a prior art turbine shroud segment 63 manufactured, for example, using subtractive manufacturing techniques, not all baseline shroud segments in accordance with the present disclosure are manufactured using subtractive techniques. In some embodiments, an additively manufactured or a large channeled cooled shroud segment may be the baseline, but the disclosed tailoring process with respect to local thermal loading may still improve thermal management performance.

With the above in mind, the illustrated method 90 includes thermally modeling (block 92) a baseline digital version of a baseline turbine shroud segment (e.g., the prior art turbine shroud segment 63 of FIG. 5) to determine a baseline thermal model result. For example, mesh software, boundary condition software, flow solver software, and other software may be utilized for heat transfer coefficients and thermal solvers.

The illustrated method 90 of FIG. 7 also includes thermally modeling (block 94) a first digital version of a first candidate replacement shroud segment to determine a first thermal model result. As previously described, digital versions of the shroud segment (and other parameters of the thermal modeling technique) may include the use of some combination software. In other words, digital versions of the baseline shroud segment (e.g., segment 63 of FIG. 5) being replaced, and of the candidate replacement shroud segments (e.g., segment 72 of FIG. 6), may be modeled utilizing a similar process for direct comparisons.

Focusing again on FIG. 7, the illustrated method 90 includes thermally modeling (block 95) a second digital version of a second candidate shroud segment to determine a second thermal model result. Indeed, the illustrated method 90 may include any number of thermal modeling steps of digital versions of various candidate shroud segments (as represented by block 96). In general, digital versions of candidate replacement turbine shroud segments, and corresponding thermal models and results, may be generated via other processes.

The illustrated method 90 also includes selecting (block 98) to manufacture the first candidate replacement shroud segment based on a comparison between the first, second, and any additional thermal results corresponding with the first, second, and any additional digital versions of the candidate replacement shroud segments. For example, after modeling the above-described characteristic(s) (and/or any other design characteristics) via the aforementioned thermal modeling techniques, the thermal modeling results are compared to select an appropriate design. In some embodiments, the method 90 also includes ensuring (block 100) that the thermal model result of the selected (e.g., first) candidate shroud segment is an improvement over the baseline thermal model result.

The method 90 also includes additively manufacturing (block 102) a replacement shroud segment from the selected (e.g., first) digital candidate shroud segment, and installing (block 104) the additively manufactured shroud segment in the appropriate location of the turbine shroud. These features will be described in detail below with reference to later drawings.

With respect to FIG. 7, it should be noted that, in some embodiments, no baseline shroud segment is involved. For example, in some embodiments, the tailoring and manufacturing process may be carried out for a new turbine shroud that does not include a baseline shroud segment being replaced.

Further, with respect to FIG. 7 and the present disclosure in general, it should be noted that the baseline shroud segment of FIG. 7 may be a shroud segment manufactured via traditional techniques (e.g., the prior art shroud segment 63 of FIG. 5), or a shroud segment manufactured via additive techniques. For example, in some embodiments, a shroud segment having additively manufactured shroud segments may, during maintenance at a later date, need a particular additively manufactured shroud segment replaced. The replacement segment may also be additively manufactured, and may be designed via the iterative tailoring process included in FIG. 7.

Figure 8:
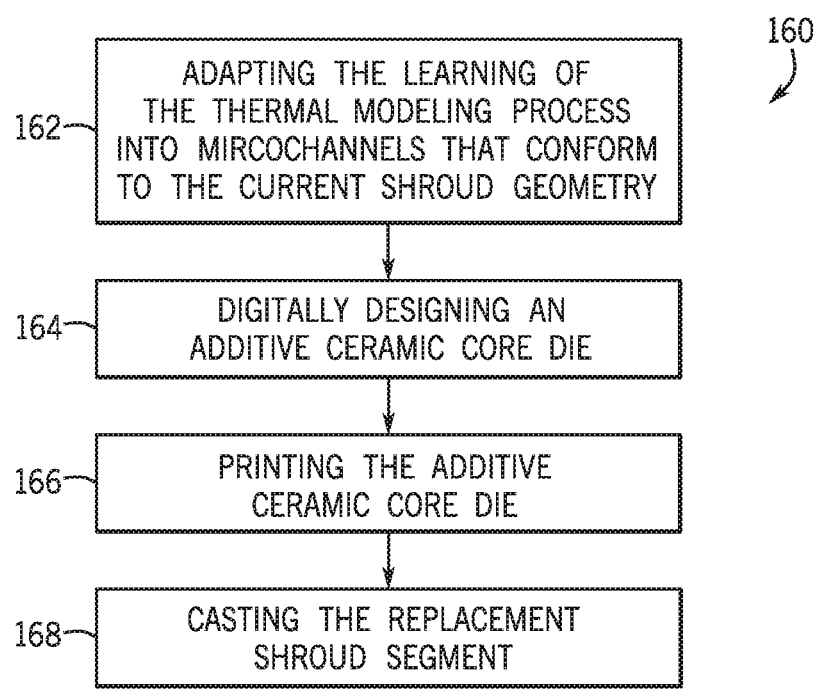
FIG. 8 is an embodiment of a method of additively manufacturing a turbine shroud segment, in accordance with an aspect of the present disclosure.

An embodiment of a method 160 of additively manufacturing the selected candidate replacement shroud segment (e.g., in block 102 of FIG. 7) is illustrated in FIG. 8. In the illustrated embodiment, the method 160 includes adapting (block 162) the learnings of the thermal modeling process in any one or more of blocks 92-100 of the method 90 of FIG. 7 into channels that conform to the current shroud geometry. For example, while first, second, third, and more candidate shroud geometries were discussed with reference to FIG. 7, various individual features of each candidate segment may be determined to be ideal, and may be packaged into the selected geometry. Additionally or alternatively, the selected geometry may be adapted for fitting in the location of the turbine shroud needing the replacement shroud segment.

Figure 9:
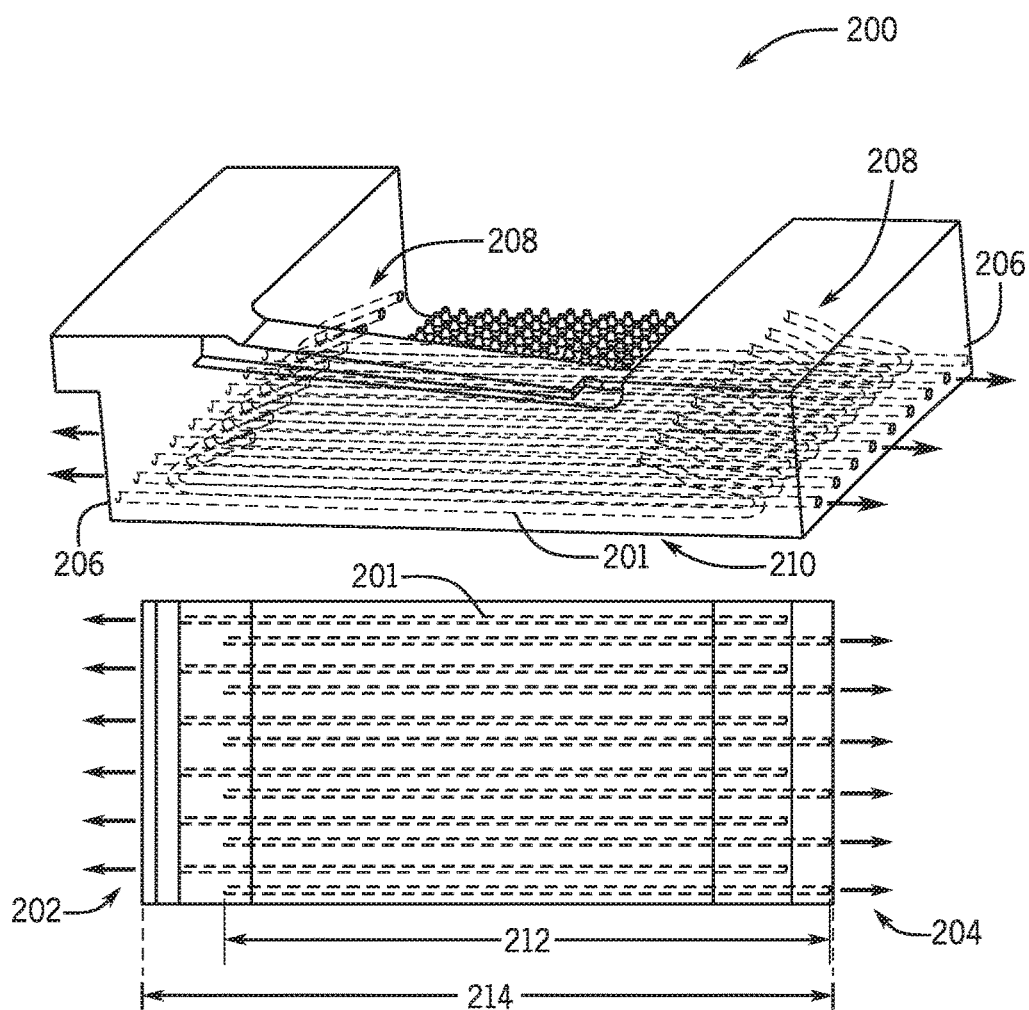
FIG. 9 is an embodiment of an additively manufactured turbine shroud segment, in accordance with an aspect of the present disclosure.

A schematic side perspective view and a corresponding bottom view of an example of an additional additively manufactured shroud segment 200 to be included in a turbine shroud (e.g., in a new turbine shroud, or as a replacement of a segment of a pre-existing turbine shroud) is shown in FIG. 9. The additively manufactured shroud segment 200 in FIG. 9 differs from the additively manufactured shroud segment 72 illustrated in FIG. 6, for example, due to the tailored manufacturing process previously described. In other words, both of the additively manufactured shroud segments 72, 200 (e.g., of FIG. 6 and of FIG. 9) may be generated utilizing the method 90 of FIG. 7 to accommodate different needs (e.g., different locations of a turbine shroud, different turbine shrouds, etc.). As shown, the additively manufactured shroud segment 200 in FIG. 9 includes cooling channels 201 routing coolant flow in a first direction 202, and cooling channels 201 routing coolant flow in and a second direction 204 opposite to the first direction 202. Further, the cooling channels 201 includes bends 208 that enable the coolant to be routed in from a plenum, and then into the channels 201 parallel to a flow path surface 210. The cooling channels 201 run parallel to the flow path surface 210 a distance 212 of at least fifty percent a length 214 of the flow path surface 210, at least seventy five percent the length 214 of the flow path surface 210, or at least ninety percent the length 214 of the flow path surface 210 (e.g., at least seventy five percent in the illustrated embodiment). In some embodiments, the cooling channels 201 may include two bends, three bends, four bends, or more bends or curvatures, which would not otherwise be possible using traditional drilling techniques.

Continuing with FIG. 8, the method 160 includes digitally designing (block 164) an additive ceramic core die. For example, the digital design may include a slurry inlet and outlet, a wrap of the desired channel surfaces, a channel support structure, and other features. In general, the digital design of the additive ceramic core die is made to enable 3-D printing of the additive ceramic core die, such that the additive ceramic core die can be used to cast the turbine shroud segment.

The method 160 also includes printing (block 166) the additive ceramic core die in accordance with the design of block 164. The additive ceramic core die may be printed using, for example, stereolithography techniques. Utilizing stereolithography or other 3-D printing techniques, an additive ceramic core die having more complex and delicate features may be generated, which ultimately may improve an effectiveness of the thermal management architecture of the replacement shroud segment. In other words, other techniques may not be capable of designing a die, or subsequent replacement shroud segment, having the shroud segment features described in detail above.

The method 160 also includes casting (block 168) the replacement shroud segment. For example, the additive core die may be utilized to cast the replacement shroud segment. After the material of the replacement shroud segment cools and solidifies, the additive core die may be broken and removed from, for example, the newly formed thermal management architecture of the replacement shroud segment.

Focusing again on FIG. 9, it should be noted that the illustrated embodiment includes several features that may be enabled via the aforementioned additive manufacturing of the shroud segment 200. For example, the shroud segment 200 may include features for which conventionally designed shroud segments cannot be manufactured, including features related to any one or more of the shape of the cooling channels, the orientation of the cooling channels, the pitch of the cooling channels, a distance between the channels and the flow path surface (e.g., "offset distance"), the inlet geometry of the cooling channels, the channel diameters, a ratio of the channel diameter (or other height dimension, in non-circular embodiments) to a shroud segment thickness, a ratio of the offset distance to the shroud segment thickness, a ratio of the pitch to the channel diameter, etc. Individual ones of these features are described below with reference to FIGS. 10-14.

Figure 10:
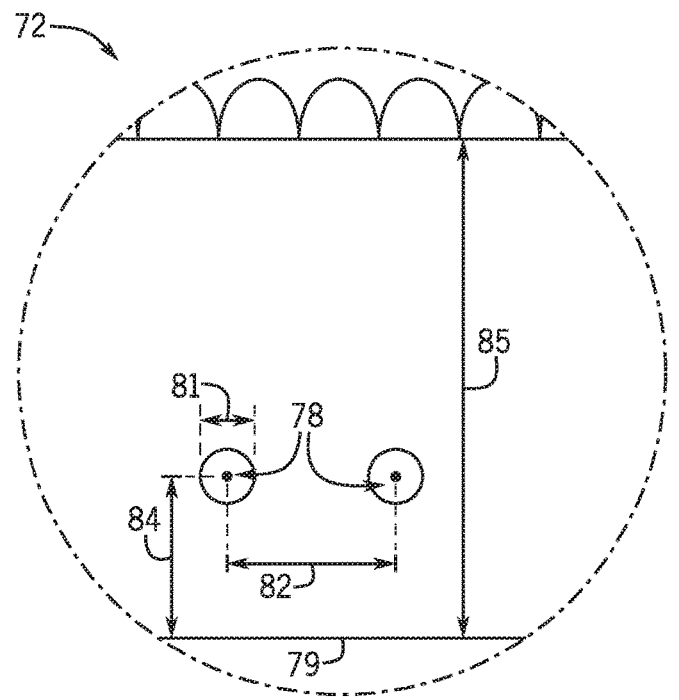
FIG. 10 illustrates an embodiment of a portion of the additively manufactured turbine shroud segment of FIG. 6, taken along line 11-11 in FIG. 6, in accordance with an aspect of the present disclosure.

FIG. 10 illustrates an embodiment of a portion of the additively manufactured turbine shroud segment 72 of FIG. 6, taken along line 11-11 in FIG. 6. As previously described, the turbine shroud segment 72 includes cooling channels 78 extending through the turbine shroud segment 72. The cooling channels 72 include diameters 81 (or a height dimension in embodiments having non-circular cooling channels 72) and pitch 82 sized to enable efficient cooling. Further, the cooling channels 72 may be spaced from the flow path surface 79 by the previously described offset distance 84.

In accordance with the present disclosure, certain parameters of the cooling channels 78 may be improved and/or enabled by additively manufacturing the turbine shroud segment 72. For example, a ratio of the channel diameter 81 to the shroud thickness 85 may be within a range of 0.1 and 0.5. A ratio of the offset distance 84 to the shroud thickness 85 may be within a range of 0.1 and 0.5. A ratio of the pitch 82 to the channel diameter 81 ("P/D") may be within a range of:

$$\frac{(\text{Channel diameter 81} + \text{Constant Offset})}{\text{channel diameter 81}} \leq \frac{P}{D} \leq 15,$$

where Constant Offset is a constant and indicative of minimal material between holes. Thus, the P/D ratio may be between approximately 1 and 15.

Figure 11:
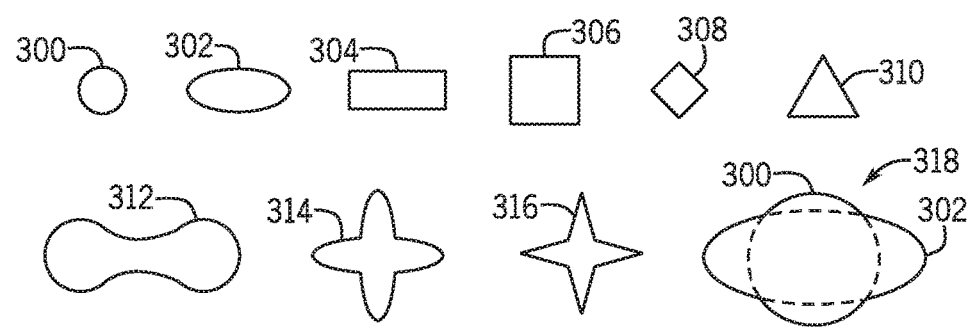
FIG. 11 is a cross-sectional schematic view illustrating various embodiments of a channel cross-sectional shape for use in the turbine shroud segment of FIG. 6 or FIG. 9, in accordance with an aspect of the present disclosure.

FIG. 11 is a cross-sectional schematic view illustrating various embodiments of a channel cross-sectional shape for use in the turbine shroud segment of FIG. 6 or FIG. 9. For example, the cross-sectional shape of a given channel may be a circle 300, an oval 302, a rectangle 304, a square 306, a diamond 308, a triangle 310, a peanut 312, a clover 314, a star 316, or a combination-shape 318 (e.g., having the circle 300 and the oval 302 overlapping each other). Other shapes are also possible. It should be noted that conventional subtractive manufacturing techniques (e.g., using drills) may not be capable of producing channels/bore holes with non-circular shapes.

Figure 12:
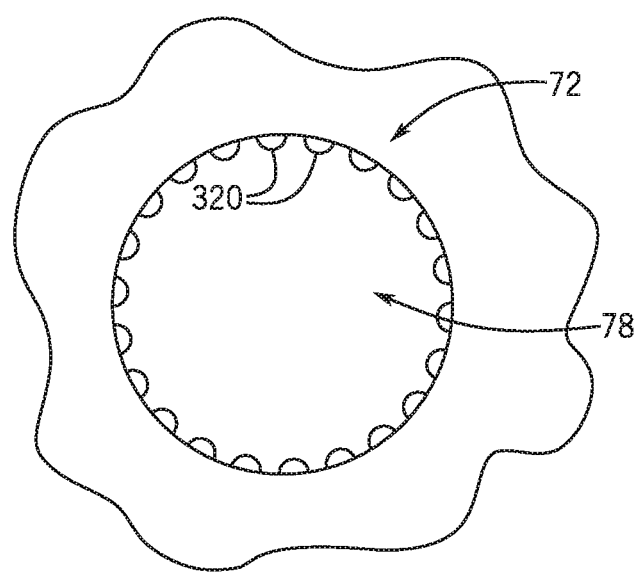
FIG. 12 is a cross-sectional schematic view illustrating an embodiment of a cooling channel for use in the turbine shroud segment of FIG. 6 or FIG. 9, in accordance with an aspect of the present disclosure.

FIG. 12 is a cross-sectional schematic view illustrating an embodiment of one cooling channel 78 for use in the turbine shroud segment 72 of FIG. 6 or FIG. 9. As shown, the cooling channel 78 includes raised bumps 320 (e.g., mounds). In another embodiment, the cooling channel 78 may include dimples (e.g., circular, semi-circular, or otherwise shaped) or some other surface texture or features (e.g., ribs). In some embodiments, surface textures such as those described above may be selectively included in portions of the cooling channel 78 to augment fluid flow. It should be noted that conventional subtractive manufacturing techniques (e.g., using drills) may not be capable of producing channels/bore holes having surface textures such as the illustrated raised bumps 320 or the aforementioned dimples.

Figure 13:
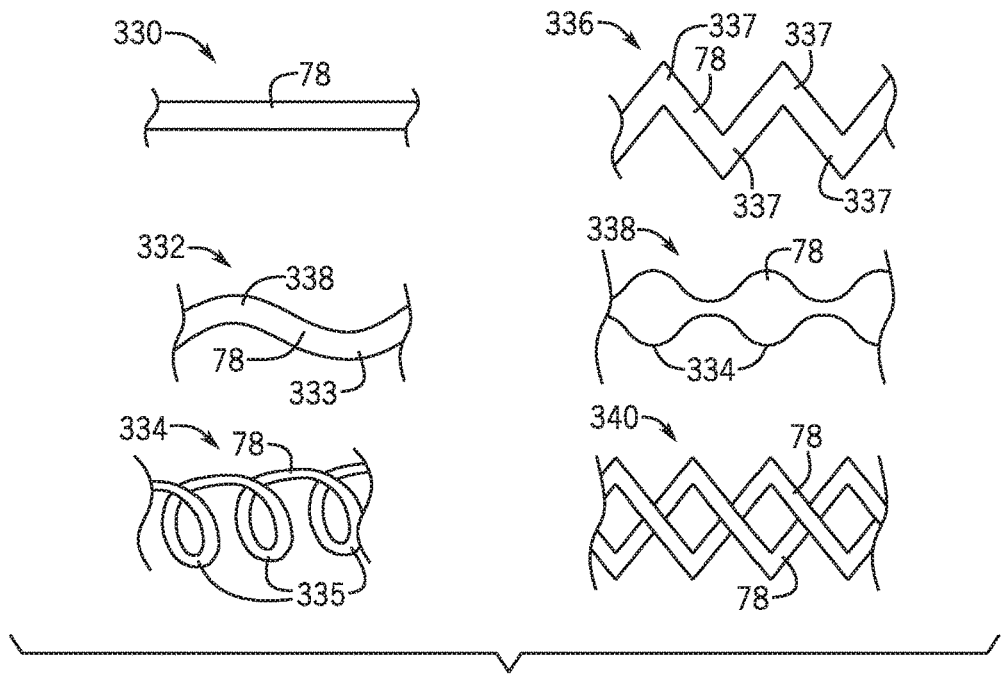
FIG. 13 is a schematic view illustrating various embodiments of a cooling channel longitudinal shape and/or orientation for use in the turbine shroud segment of FIG. 6 or FIG. 9, in accordance with an aspect of the present disclosure.

FIG. 13 is a schematic view illustrating various embodiments of a cooling channel longitudinal shape and/or orientation for use in the turbine shroud segment 72 of FIG. 6 or FIG. 9. For example, the cooling channel 78 may be straight 330, curved 332 (e.g., having one or more curvilinear bends 333), cork-screw 334 (e.g., having one or more loops 335), saw-tooth 336 (e.g., having one or more pointed bends 337), hour-glass 338 (e.g., having one or more thick bulbs 339, which include larger cross-sections), lattice 340 (e.g., having two cooling channels 78 with curvilinear or pointed bends arranged in a lattice structure), or some other longitudinal shape. As previously described, conventional subtractive manufacturing techniques (e.g., using drills) may not be capable of producing channels/bore holes having non-straight channels.

Figure 14:
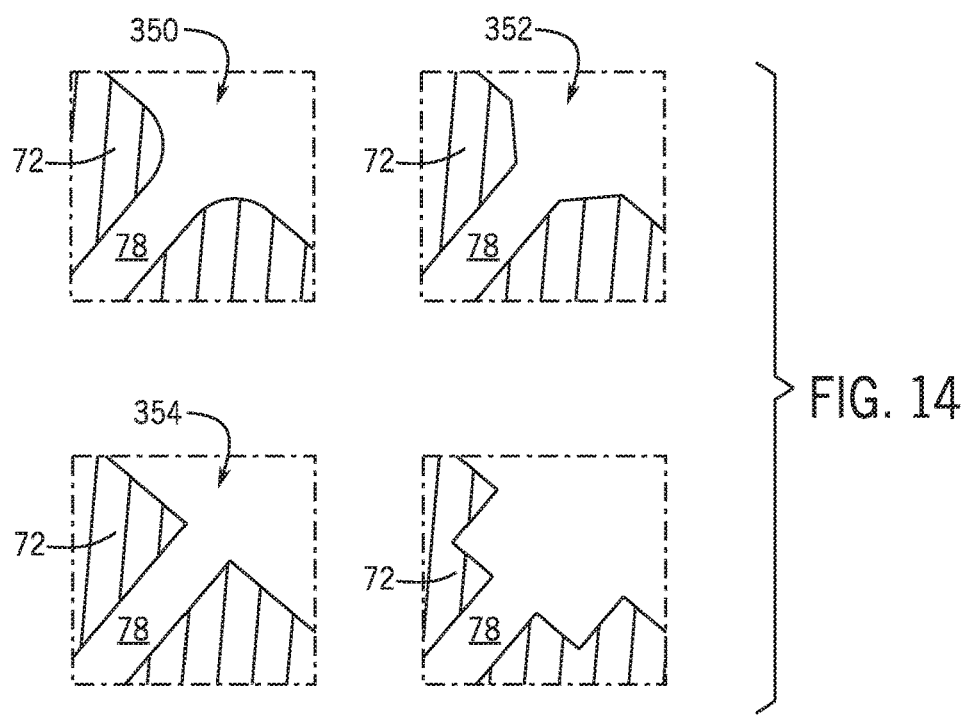
FIG. 14 is a schematic view illustrating various embodiments of a cooling inlet geometry for use in the turbine shroud segment of FIG. 6 or FIG. 9, in accordance with an aspect of the present disclosure.

FIG. 14 is a schematic view illustrating various embodiments of a cooling inlet geometry for use in the turbine shroud segment 72 of FIG. 6 or FIG. 9. As shown, the cooling channel 78 may include a curved inlet 350 geometry, a beveled inlet 352 geometry, a square/straight/flush inlet 354 geometry, a stepped inlet 356 geometry, or some other type of inlet geometry. It should be noted that conventional subtractive manufacturing techniques (e.g., using drills) may be not be capable of producing channels/bore holes having tailored inlet geometries (and/or conventional subtractive manufacturing techniques may require excessive manufacturing steps to obtain the illustrated inlet geometries).

Figure 15:
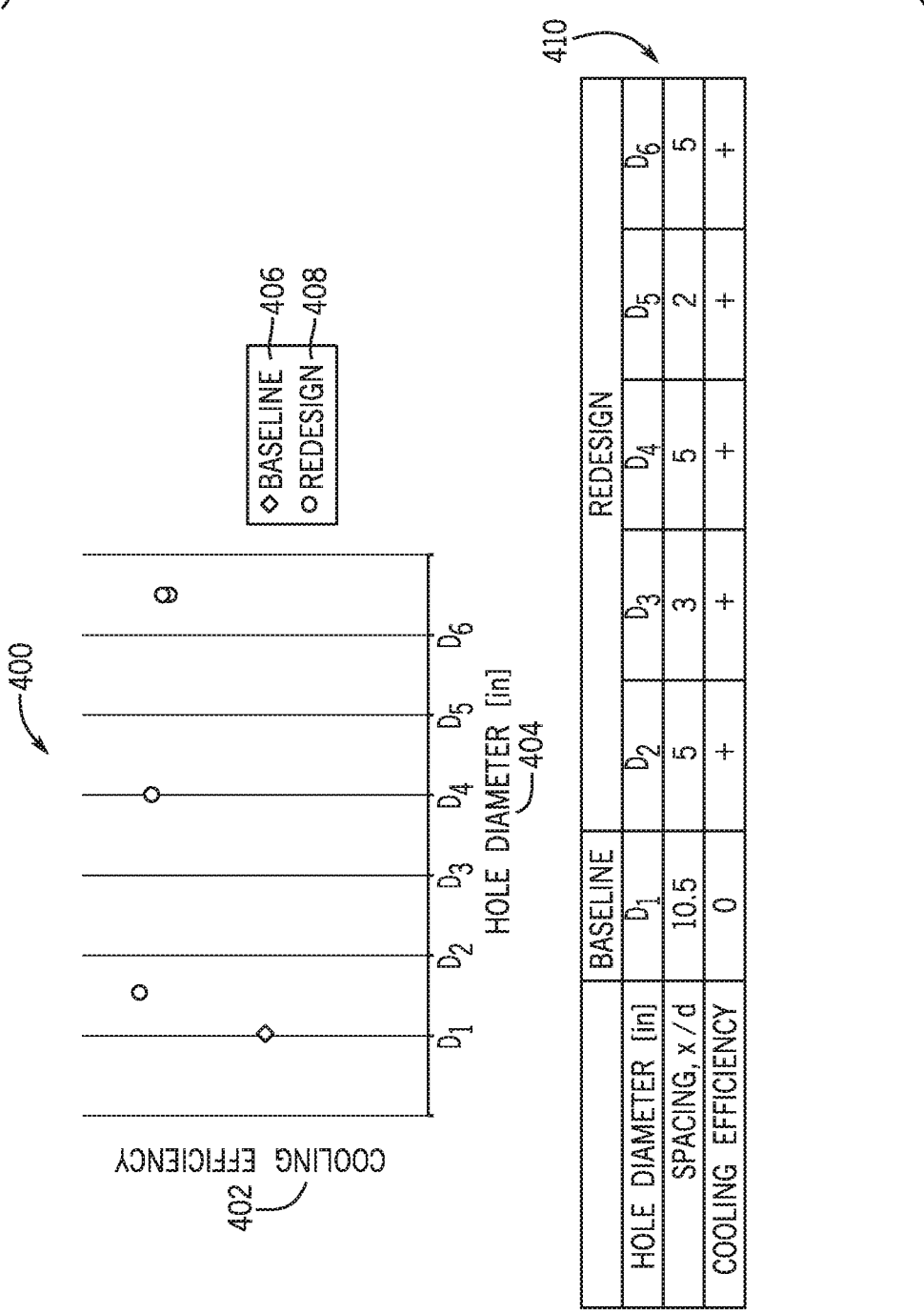
FIG. 15 is an embodiment of a data plot illustrating cooling efficiency plotted against hole diameter, in accordance with an aspect of the present disclosure.

The above-described characteristics may be tested via the above-described iterative thermal modeling/shroud tailoring processes, in order to determine a desirable thermal management architecture for manufacturing a particular turbine shroud segment. FIG. 15 illustrates an embodiment of a plot 400 indicating cooling efficiency of various thermal management architectures in which cooling channel ("hole") diameter is varied. In other words, cooling efficiency 402 is plotted against hole diameter 404. The plot 400 includes the aforementioned baseline (e.g., conventional) segment 406 and several redesigns 408. A table 410 below the plot 400 provides other relevant data.

Technical effects of the invention include improved thermal management of turbine shroud segments. For example, by tailoring thermal management architecture to particular thermal loads expected adjacent the turbine shroud segment, the turbine shroud segment may be more accurately and efficiently cooled. Further, the additively manufactured thermal management architecture may include different features than those produced by conventional techniques, such as: certain shapes of the cooling channels, certain orientations of the cooling channels, a certain pitch of the cooling channels, distances between the channels and the flow path surface (e.g., "offset distance"), certain inlet geometries of the cooling channels, certain channel diameters, certain ratios of the channel diameter (or other height dimension, in non-circular embodiments) to a shroud segment thickness, certain ratios of the offset distance to the shroud segment thickness, certain ratios of the pitch to the channel diameter, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine system having a turbine shroud segment, wherein the turbine shroud segment comprises:
   a backside;
   a flow path surface opposite to the back side and configured to be disposed adjacent a hot gas path of the turbine system;
   side walls extending between the backside of the turbine shroud segment and the flow path surface of the turbine shroud segment; and
   a plurality of cooling channels disposed in a thickness of the turbine shroud segment between the backside and the flow path surface, wherein each cooling channel of the plurality of cooling channels comprises an outlet at one of the side walls of the turbine shroud segment.

2. The turbine system of claim 1, wherein each cooling channel of the plurality of cooling channels extends parallel to the flow path surface a distance comprising at least fifty percent a total length of the flow path surface of the shroud segment.

3. The turbine system of claim 1, wherein a first subset of the plurality of cooling channels is configured to route coolant in a first direction, and wherein a second subset of the plurality of cooling channels is configured to route the coolant in a second direction transverse to the first direction.

4. The turbine system of claim 1, wherein a cross-section of each cooling channel of the plurality of cooling channels comprises a non-circular shape.

5. The turbine system of claim 4, wherein the cross-section comprises a triangular shape, a square shape, a rectangular shape, an oval shape, or a star shape.

6. The turbine system of claim 1, wherein a first sub-set of the plurality of cooling channels comprises a first cooling channel shape, and wherein a second sub-set of the plurality of cooling channels comprises a second cooling channel shape different than the first cooling channel shape.

7. The turbine system of claim 1, wherein each cooling channel of the plurality of cooling channels comprises at least one bend.

8. The turbine system of claim 7, wherein each cooling channel of the plurality of cooling channels comprises at least two bends.

9. The turbine system of claim 1, wherein an additive core die is disposed within the plurality of cooling channels, wherein the additive core die is configured to be broken and removed from the plurality of cooling channels.

10. The turbine system of claim 1, wherein at least one cooling channel of the plurality of cooling channels comprises a non-uniform cross-sectional shape or area along a length of the cooling channel.

11. The turbine system of claim 1, wherein at least one cooling channel of the plurality of cooling channels comprises raised bumps or dimples along a surface of the at least one cooling channel.

12. The turbine system of claim 1, wherein each cooling channel of the plurality of cooling channels comprises a diameter, wherein each cooling channel of the plurality of cooling channels comprises a portion extending parallel to the flow path surface and at an offset distance from the flow path surface, and wherein the turbine shroud segment comprises at least one of the following:
    a ratio of the diameter to the thickness within a range of 0.1 and 0.5; or
    a ratio of the offset distance to the thickness within a range of 0.1 and 0.5.

13. The turbine system of claim 1, wherein the backside of the turbine shroud segment comprises raised bumps configured to enhance impingement cooling of the backside of the turbine shroud segment.

14. A method of manufacturing a turbine shroud segment, comprising:
    selecting a thermal management architecture for the turbine shroud segment; and
    additively manufacturing the turbine shroud segment, via a casting process, such that the turbine shroud segment includes the selected thermal management architecture.

15. The method of claim 14, wherein additively manufacturing the turbine shroud segment, via a casting process, such that the turbine shroud segment includes the selected thermal management architecture comprises:
    forming a die corresponding with the selected thermal management architecture;
    disposing the die in a liquid form of a material of the turbine shroud segment; and
    breaking and removing the die after the material of the turbine shroud segment solidifies from the liquid form to a solid form.

16. The method of claim 15, comprising forming the die via a 3-D printing technique.

17. A method of manufacturing a turbine shroud segment for a turbine shroud, comprising:
    thermally modeling, based on an expected thermal loading on the turbine shroud segment corresponding with an expected position of the turbine shroud segment within the turbine shroud, a first digital version of the turbine shroud segment to determine a first thermal model result of the first digital version, wherein the first digital version comprises a first parameter of a thermal management characteristic;
    thermally modeling, based on the expected thermal loading on the turbine shroud segment corresponding with the expected position of the turbine shroud segment within the turbine shroud, a second digital version of the turbine shroud segment to determine a second thermal model result of the second digital version, wherein the second digital version comprises a second parameter of the thermal management characteristic, and wherein the second parameter of the thermal management characteristic is different than the first parameter of the thermal management characteristic;
    selecting to manufacture the first digital version based on a comparison between the first thermal model result and the second thermal model result; and
    additively manufacturing the turbine shroud segment based on the first digital version.

18. The method of claim 17, comprising:
    thermally modeling a baseline digital version of a baseline turbine shroud segment to determine a baseline thermal model result of the baseline digital version, wherein the baseline turbine shroud segment corresponds with a part to be replaced in the turbine shroud; and
    ensuring that the first thermal model result is an improvement over the baseline thermal model result.

19. The method of claim 17, wherein the thermal management characteristic comprises a cross-sectional shape of a cooling channel, a cross-sectional size of the cooling channel, a direction of flow of the cooling channel, or a pitch between adjacent cooling channels.

20. The method of claim 17, wherein additively manufacturing the turbine shroud segment based on the first digital version comprises:
    generating a die corresponding with a thermal management architecture of the first digital version; and
    disposing the die in a liquid form of a material of the turbine shroud segment; and
    breaking and removing the die from the material of the turbine shroud segment after the material changes from the liquid form to a solid form.

* * * * *